(12) United States Patent
    Ito et al.

(10) Patent No.: US 9,759,485 B2
(45) Date of Patent: Sep. 12, 2017

(54) VACUUM FREEZE-DRYING APPARATUS AND FROZEN PARTICLE MANUFACTURING METHOD

(71) Applicant: ULVAC, Inc., Chigasaki-shi, Kanagawa (JP)

(72) Inventors: Masaki Ito, Chigasaki (JP); Youichi Oohinata, Chigasaki (JP); Katsuhiko Ito, Chigasaki (JP); Takashi Hanamoto, Chigasaki (JP); Takao Kinoshita, Chigasaki (JP)

(73) Assignee: ULVAC, INC., Chigasaki-shi (JP)

( * ) Notice: Subject to any disclaimer, the term of this patent is extended or adjusted under 35 U.S.C. 154(b) by 689 days.

(21) Appl. No.: 13/871,215

(22) Filed: Apr. 26, 2013

(65) Prior Publication Data
    US 2013/0239430 A1    Sep. 19, 2013

Related U.S. Application Data

(63) Continuation of application No. PCT/JP2011/074436, filed on Oct. 24, 2011.

(30) Foreign Application Priority Data

Oct. 29, 2010   (JP) .................................. 2010-244264

(51) Int. Cl.
    *F26B 5/06*        (2006.01)
    *A23L 3/44*        (2006.01)
    (Continued)

(52) U.S. Cl.
    CPC   *F26B 5/12* (2013.01); *A23L 3/44* (2013.01);
          *B01D 1/18* (2013.01); *B01J 2/04* (2013.01);
          *F26B 5/06* (2013.01); *F26B 5/065* (2013.01)

(58) Field of Classification Search
    CPC ........................................................ A23L 3/44
    See application file for complete search history.

(56) References Cited

U.S. PATENT DOCUMENTS

2,297,726 A * 10/1942  Stephanoff ............... B01D 1/18
                                                  116/137 A
2,883,147 A *  4/1959  Mirza ..................... F16K 13/02
                                                     251/159
(Continued)

FOREIGN PATENT DOCUMENTS

JP       S60-83576       5/1985
JP    2004-232883 A1    8/2004
(Continued)

OTHER PUBLICATIONS

International Preliminary Report on Patentability dated May 23, 2013 issued in counterpart application No. PCT/JP2011/074436 (5 pages).

(Continued)

*Primary Examiner* — Kenneth Rinehart
*Assistant Examiner* — Logan Jones
(74) *Attorney, Agent, or Firm* — Kratz, Quintos & Hanson, LLP

(57) ABSTRACT

A technology for protecting a valve seat inside a collection tank from the adherence of frozen particles in a vacuum freeze-drying apparatus and a frozen particle manufacturing method. The inside of a vacuum tank and a collection tank are vacuum evacuated; a raw material liquid is injected into the vacuum tank to produce frozen particles; and the frozen particles are piled up on a surface of a heating/cooling shelf. When the frozen particles on the heating/cooling shelf are transferred into the collection tank through the inside of an (Continued)

auxiliary pipe, the frozen particles do not adhere to a valve seat which surrounds an opening of a main pipe inside the collection tank.

7 Claims, 4 Drawing Sheets

(51) Int. Cl.
    *F26B 5/12*     (2006.01)
    *B01D 1/18*     (2006.01)
    *B01J 2/04*     (2006.01)

(56) References Cited

U.S. PATENT DOCUMENTS

| | | | | |
|---|---|---|---|---|
| 3,045,642 A * | 7/1962 | Prugne | C23C 14/246 | 118/726 |
| 3,226,467 A * | 12/1965 | Kienel | B01J 3/006 | 174/151 |
| 3,281,954 A * | 11/1966 | Baer | A23C 1/08 | 34/92 |
| 3,483,709 A * | 12/1969 | Sayres | F17C 3/085 | 165/287 |
| 4,106,796 A * | 8/1978 | Asztalos | F16L 39/005 | 285/123.12 |
| 4,137,935 A * | 2/1979 | Snowdon | B65G 53/4658 | 137/242 |
| 4,182,386 A * | 1/1980 | Alack | B65G 69/182 | 108/55.1 |
| 4,519,579 A * | 5/1985 | Brestel | F16K 1/2263 | 251/172 |
| 4,685,843 A * | 8/1987 | Kelm | A01C 7/082 | 406/181 |
| 4,717,289 A * | 1/1988 | Popowich | B05B 1/14 | 111/175 |
| 4,730,511 A * | 3/1988 | Tsujimura | F16H 21/54 | 269/233 |
| 4,771,634 A * | 9/1988 | DiFoggio | B01D 11/0219 | 585/833 |
| 4,954,047 A * | 9/1990 | Okuyama | F04B 25/02 | 415/90 |
| 5,076,344 A * | 12/1991 | Fields | B22D 17/14 | 164/113 |
| 5,076,737 A * | 12/1991 | Loutsch | F16K 5/204 | 406/183 |
| 5,090,132 A * | 2/1992 | Kobayashi | F26B 5/06 | 34/302 |
| 5,101,853 A * | 4/1992 | Mailliet | B65G 53/46 | 137/242 |
| 5,348,063 A * | 9/1994 | Handleman | B65B 1/28 | 141/10 |
| 5,961,009 A * | 10/1999 | Rekers | B65D 77/065 | 222/523 |
| 6,988,708 B2 * | 1/2006 | Caprera | F16K 1/2265 | 251/171 |
| 8,146,626 B2 * | 4/2012 | Purnhagen | B65B 1/16 | 141/166 |
| 2011/0113643 A1* | 5/2011 | Itou | A23L 3/44 | 34/92 |
| 2011/0113644 A1* | 5/2011 | Itou | A23L 3/44 | 34/287 |
| 2011/0192047 A1* | 8/2011 | Itou | F26B 5/065 | 34/287 |

FOREIGN PATENT DOCUMENTS

JP           2006-90671 A1     4/2006
WO     WO 2010/005015 A1     1/2010

OTHER PUBLICATIONS

International Search Report for International Application No. PCT/JP2011/074436 dated Jan. 24, 2012.

* cited by examiner

VACUUM FREEZE-DRYING APPARATUS AND FROZEN PARTICLE MANUFACTURING METHOD

BACKGROUND

The present invention is generally related to a vacuum freeze-drying apparatus and a frozen particle manufacturing method.

FIG. 6 is an internal configuration view of a conventional vacuum freeze-drying apparatus.

A vacuum freeze-drying apparatus 100 includes a vacuum tank 111, a collection tank 112 disposed below the vacuum tank 111, a pipe 121 provided respectively with first and second openings 122 and 124 at one end and the other end, the first opening 122 being exposed inside the collection tank 112 and the second opening 124 being exposed inside the vacuum tank 111, and a valve element 115 that switches between blocking and opening the first opening 122.

A valve seat 123 having ring-shape is adhered to and fixed onto the other end of the pipe 121 so as to surround the first opening 122. The valve seat 123 is, for example, a rubber O-ring.

The valve element 115 is disposed below the valve seat 123. When the surface of the value element 115 is pressed against the valve seat 123 and closely adhered thereto in a ring-shape, the first opening 122 is blocked; whereas, when the surface of the valve element 115 is separated from the valve seat 123, the first opening 122 is opened.

Vacuum evacuation units 113a and 113b are connected to the vacuum tank 111 and the collection tank 112, respectively; and vacuum ambiences are created within the vacuum tank 111 and the collection tank 112.

When a raw material liquid is injected from an injector 116 into the vacuum tank 111, which has been vacuum evacuated, a liquid component evaporates from the injected raw material liquid, the raw material liquid is instantaneously cooled, and frozen particles are produced. The produced frozen particles are piled up on the surface of a heating/cooling shelf 117.

When the heating/cooling shelf 117 is tilted, the frozen particles that have collected thereon slide off from the surface of the heating/cooling shelf 117 and fall into the second opening 124.

If the first opening 122 is opened, the frozen particles pass through the inside of the pipe 121 and are transferred into the collection tank 112.

A part of the frozen particles pass through the first opening 122; and when they are released into the collection tank 112, they are in contact with the valve seat 123 and adhere thereto.

After the frozen particles have been transferred into the collection tank 112, the valve element 115 is pressed against the valve seat 123 so as to block the first opening 122. The inside of the collection tank 112 is opened to the air atmosphere, or a compressed gas is fed into the collection tank 112 from a gas introduction part (not shown); and the frozen particles are carried out from the inside of the collection tank 112.

If the frozen particles adhere to the valve seat 123, the frozen particles may become sandwiched between the valve element 115 and the valve seat 123; and thus, a gap may occur even if the valve element 115 is pressed against the valve seat 123. Thus, there has been a problem in that leaks (air leaks) occur inside the vacuum tank 111 when the inside of the collection tank 112 is opened to the air atmosphere; and as a result, the vacuum freeze-drying performance is decreased. See, for example, JPA 2004-232883.

SUMMARY OF THE INVENTION

The present invention is created in order to overcome the deficiencies in the conventional art discussed above; and an object of the present invention is to provide a technology for protecting a valve seat inside a collection tank from the adherence of frozen particles in a vacuum freeze-drying apparatus and a frozen particle manufacturing method.

In order to solve the above-described problem, the present invention provides a vacuum freeze-drying apparatus, which includes a vacuum tank, a collection tank disposed below the vacuum tank, a main pipe having a first opening and a second opening respectively at one end and the other end, the first opening being exposed inside the collection tank and the second opening being exposed inside the vacuum tank, a valve element which switches between blocking and opening the first opening, a vacuum evacuation unit which vacuum evacuates the inside of the vacuum tank and the inside of the collection tank, an injector which injects a raw material liquid into the vacuum evacuated vacuum tank so as to produce frozen particles, and a heating/cooling shelf disposed inside the vacuum tank on which the produced frozen particles are piled up on the surface of the heating/cooling shelf. After the first opening is opened and the frozen particles on the heating/cooling shelf are transferred into the collection tank through the inside of the main pipe, the first opening is blocked and the frozen particles are carried out from the inside of the collection tank. The vacuum freeze-drying apparatus further includes an auxiliary pipe inserted into the main pipe, one end thereof being disposed inside the vacuum tank and the other end thereof being positioned inside the main pipe when the first opening is blocked, a moving device that reciprocates the auxiliary pipe along the longitudinal direction of the main pipe, wherein when the first opening is opened, the auxiliary pipe can reciprocate between a position where the other end protrudes to the outside of the main pipe through the first opening and a position where the other end enter the inside of the main pipe through the first opening.

The present invention is a vacuum freeze-drying apparatus that further includes sealing members, which block a sliding space between a part of an inner circumferential surface of the main pipe and a part of an outer circumferential surface of the auxiliary pipe from an inside space of the vacuum tank and an inside space of the collection tank.

The present invention is the vacuum freeze-drying apparatus on which convexes and concaves are provided on an inner circumferential surface of the auxiliary pipe.

The present invention is a frozen particle manufacturing method, which includes the steps of vacuum evacuating the inside of a vacuum tank and the inside of a collection tank, injecting a raw material liquid into the vacuum tank and producing frozen particles, piling up the frozen particles on a surface of a heating/cooling shelf disposed inside the vacuum tank, opening a first opening of a main pipe having the first opening and a second opening at one end and the other end, respectively, wherein the first opening being exposed inside the collection tank and the second opening being exposed inside the vacuum tank, transferring the frozen particles on the heating/cooling shelf to the collection tank through the inside of the main pipe, and blocking the first opening, and carrying out the frozen particles from the inside of the collection tank. The method further includes the steps, after piling up the frozen particles on the surface of the heating/cooling shelf and opening the first opening of the main pipe, of moving an auxiliary pipe which is inserted in the main pipe and which has one end being disposed inside the vacuum tank and the other end being positioned inside the main pipe to a position where the other end of the auxiliary pipe protrudes to the outside of the main pipe through the first opening, transferring the frozen particles on the heating/cooling shelf into the collection tank through the inside of the auxiliary pipe, moving the auxiliary pipe to a position where the other end enters the inside of the main pipe through the first opening, blocking the first opening, and carrying out the frozen particles from the inside of the collection tank.

The sealing performance of the valve element and the valve seat inside the collection tank can be improved. If the sealing performance is improved, the vacuum ambience inside the vacuum tank can be maintained, and the vacuum freeze-drying performance can be maintained. Furthermore, because the vacuum freeze-drying process can be carried out inside the vacuum tank while the frozen particles are carried out from the inside of the collection tank, the productivity is improved.

DETAILED DESCRIPTION OF THE INVENTION

<Structure of Vacuum Freeze-Drying Apparatus>

The structure of the vacuum freeze-drying apparatus of the present invention will be explained below.

Figure 1:
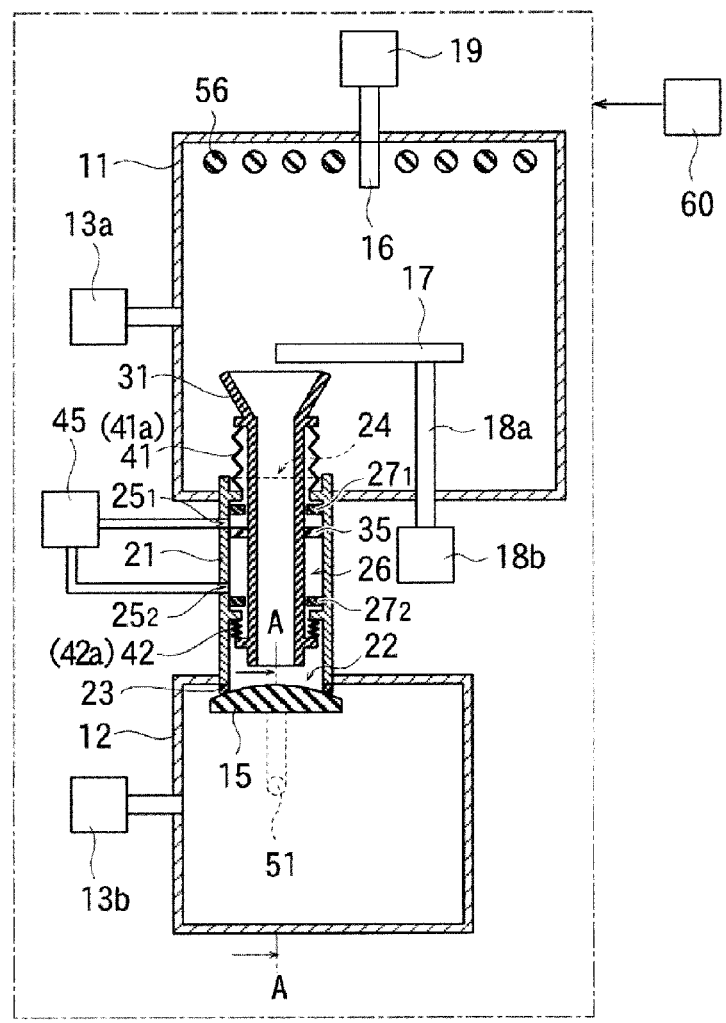
FIG. 1 is an internal configuration view of a vacuum freeze-drying apparatus of the present invention.

FIG. 1 shows the internal configuration of a vacuum freeze-drying apparatus 10.

The vacuum freeze-drying apparatus 10 includes a vacuum tank 11, a collection tank 12 disposed below the vacuum tank 11, a main pipe 21 having a first opening 22 and a second opening 24 respectively at one end and the other end (i.e, the first opening 22 is provided at the one end, and the second opening 24 is provided at the other end) and the first opening 22 being exposed inside the collection tank 12 and the second opening 24 being exposed inside the vacuum tank 11, and a valve element 15 that switches between blocking and opening the first opening 22.

In the present embodiment, the main pipe 21 has a cylindrical shape, and a center axis line thereof is oriented parallel to the vertical direction. A top end of the main pipe 21, which is the one end, is inserted in an air tight fashion into a bottom surface of the vacuum tank 11, and a bottom end of the main pipe 21, which is the other end, is inserted in an air tight fashion into a ceiling surface of the collection tank 12.

A ring-shaped valve seat 23 is closely adhered to and fixed onto the other end of the main pipe 21 inserted into the collection tank 12 so as to surround the first opening 22. The valve seat 23 is, for example, a rubber O-ring.

The valve element 15 is disposed below the valve seat 23.

Figure 2:
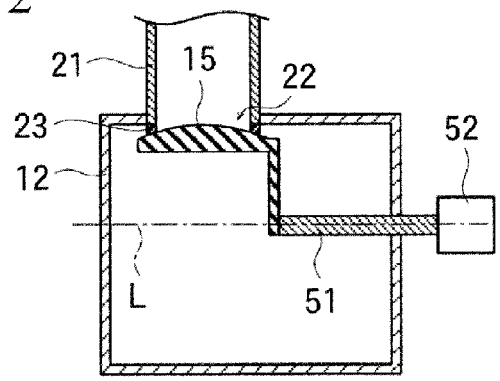
FIG. 2 is a cross-sectional view taken along line A-A of a collection tank shown in FIG. 1.

FIG. 2 is a cross-sectional view taken along line A-A of the collection tank 12 shown in FIG. 1.

In the present embodiment, a horizontal rotation shaft 51 is fixed to the valve element 15. The distal end of the rotation shaft 51 penetrates through a wall surface of the collection tank 12 in an airtight fashion and is connected to a rotation device 52 disposed on the outside of the collection tank 12.

In the present embodiment, the rotation device 52 can rotate the rotation shaft 51 by compressed air together with the valve element 15 around a center axis line L of the rotation shaft 51. The power source of the rotation device 52 is not limited to compressed air, and can also be a motor.

Figure 3:
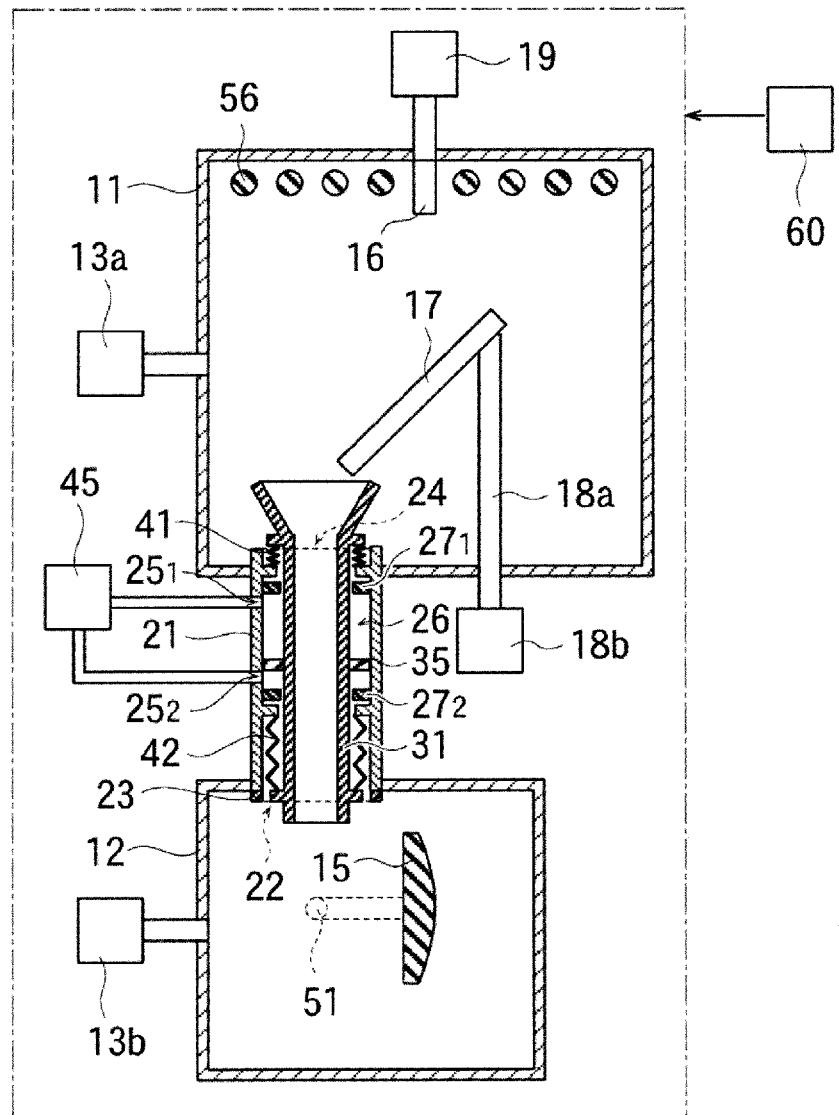
FIG. 3 is a diagram for explaining the operation of the vacuum freeze-drying apparatus.

When the valve element 15 is rotated in one rotation direction and the surface of the valve element 15 is faced toward the outside of the opening 22, the surface of the valve element 15 is separated from the valve seat 23 as shown in FIG. 3 and thereby the first opening 22 is opened.

On the other hand, when the valve element 15 is rotated in the opposite direction from the one rotation direction as discussed above, and the surface of the valve element 15 faces the first opening 22, the surface of the valve element 15 is pressed against the valve seat 23 and closely adhered thereto in an a ring-shape as shown in FIG. 1, and thereby the first opening 22 is blocked.

The vacuum freeze-drying apparatus 10 includes a vacuum evacuation unit that vacuum evacuates the inside of the vacuum tank 11 and the inside of the collection tank 12, an injector 16 that injects a raw material liquid into the vacuum tank 11 that has been vacuum evacuated in order to produce frozen particles, and a heating/cooling shelf 17 disposed inside the vacuum tank 11 onto which the produced frozen particles are piled up on the surface.

In the present embodiment, the vacuum evacuation unit includes first and second vacuum evacuate devices 13a and 13b. The first vacuum evacuation device 13a is connected to the vacuum tank 11, and the second vacuum evacuation device 13b is connected to the collection tank 12 so that the inside of the vacuum tank 11 and the inside of the collection tank 12 are vacuum evacuated individually.

The vacuum evacuation unit of the present invention is not limited to the above-discussed constitution, and it can be constituted by a single vacuum evacuation device which is connected to the vacuum tank 11 and the collection tank 12 via separate vacuum valves so that the inside of the vacuum tank 11 and the inside of the collection tank 12 can be vacuum evacuated individually by controlling the opening/closing of the each vacuum valves.

The injector 16 is disposed inside the vacuum tank 11 and is connected to a raw material liquid tank 19 in which raw material liquid is stored. When raw material liquid is supplied from the raw material liquid tank 19, the injector 16 can inject the raw material liquid inside the vacuum tank 11.

The heating/cooling shelf 17 is a flat shelf that is disposed below the injector 16.

A flow path (not shown) in which a temperature-controlled heating medium flows through is provided inside the heating/cooling shelf 17; and the surface of the heating/cooling shelf 17 can be cooled or heated to a predetermined temperature.

When raw material liquid is injected from the injector 16 to the inside of the vacuum tank 11 which has been vacuum evacuated, a liquid component evaporates from the injected raw material liquid, the raw material liquid is instantaneously cooled, and frozen particles are produced.

If the surface of the heating/cooling shelf 17 is horizontal, the produced frozen particles are piled up on the surface of the heating/cooling shelf 17.

In the present embodiment, the vacuum freeze-drying apparatus 10 includes a tilting device which tilts the heating/cooling shelf 17; and herein, the tilting device includes a support shaft 18a and a lifting device 18b.

The support shaft 18a is disposed vertically-upright below the heating/cooling shelf 17; and the bottom end of the support shaft 18a penetrates in an airtight fashion through a wall surface of the vacuum tank 11 and is attached to the lifting device 18b disposed on the outside of the vacuum tank 11.

In the present embodiment, the lifting device 18b is a hydraulic drive unit, and the lifting device 18b can reciprocate the support shaft 18a along the vertical direction by transmitting hydraulic motive power to the support shaft 18a. When the support shaft 18a is lifted, the top end of the support shaft 18a is in contact with the rear side surface of the heating/cooling shelf 17 so as to press the heating/cooling shelf upwards and tilt it. When the support shaft 18a is lowered, the surface of the heating/cooling shelf 17 extends along a horizontal position.

When the heating/cooling shelf 17 is tilted, the frozen particles which have been piled up on the surface of the heating/cooling shelf 17 slide off from the surface of the heating/cooling shelf 17 and fall into the second opening 24 at the top end of the main pipe 21. If the first opening 22 at the bottom end of the main pipe 21 is opened, the frozen particles are transferred into the collection tank 12 through the main pipe 21.

The vacuum freeze-drying apparatus 10 of the present invention also includes an auxiliary pipe 31 which is inserted into the main pipe 21, one end thereof being disposed inside the vacuum tank 11 and the other end thereof being positioned inside the main pipe 21 when the first opening 22 is blocked, and a moving device 45 which reciprocates the auxiliary pipe 31 along the longitudinal direction of the main pipe 21.

The one end of the auxiliary pipe 31 is formed in a funnel shape in a manner such that the inner circumferential diameter increases towards the end; and the other end of the auxiliary pipe 31 is inserted into the main pipe 21 through the second opening 24 of the main pipe 21.

In the present embodiment, an upper air inlet $25_1$ and a lower air inlet $25_2$ are provided on a side surface of the main pipe 21, and a piston 35 is disposed between the upper air inlet $25_1$ and the lower air inlet $25_2$. The piston 35 is fixed to the auxiliary pipe 31.

The moving device 45 is a pneumatic drive unit, and is connected to the upper air inlet $25_1$ and the lower air inlet $25_2$, respectively.

In reference to FIG. 3, in a state whereby the valve element 15 is separated from the valve seat 23 and the first opening 22 is opened, when air is introduced into the upper air inlet $25_1$ from the moving device 45, the piston 35 is compressed downwards, the auxiliary pipe 31 is lowered together with the piston 35, and the entire periphery of the bottom end of the auxiliary pipe 31 moves downward lower than the bottom end of the valve seat 23 through the first opening 22. In other words, the bottom end of the auxiliary pipe 31 protrudes towards the outside of the main pipe 21.

On the other hand, referring to FIG. 1, in a state whereby the heating/cooling shelf 17 is horizontal, when air is introduced into the lower air inlet $25_2$ from the moving device 45, the piston 35 is compressed upwards, the auxiliary pipe 31 is lifted together with the piston 35, and the entire periphery of the bottom end of the auxiliary pipe 31 moves above higher than the bottom end of the valve seat 23. In other words, the bottom end of the auxiliary pipe 31 enters the inside of the main pipe 21.

As long as the moving device 45 can reciprocate the auxiliary pipe 31 along the longitudinal direction of the main pipe 21, the constitution of the moving device is not limited. For example, the moving device 45 can hydraulically drive the auxiliary pipe 31.

The vacuum freeze-drying apparatus 10 also includes sealing members 41 and 42 that block a sliding space 26 between a part of an inner circumferential surface of the main pipe 21 and a part of an outer circumferential surface of the auxiliary pipe 31 from an inside space of the vacuum tank 11 and an inside space of the collection tank 12.

Convex sliding parts $27_1$ and $27_2$ are disposed in the sliding space 26.

In the present embodiment, the sliding parts $27_1$ and $27_2$ are fixed to an inner circumferential side surface of the main pipe 21 and the distal ends of the sliding parts $27_1$ and $27_2$ are in contact with an outer circumferential side surface of the auxiliary pipe 31 in a manner such that the auxiliary pipe 31 is supported in parallel to the main pipe 21 inside the main pipe 21.

In addition, the sliding parts $27_1$ and $27_2$ can also be fixed to an outer circumferential side surface of the auxiliary pipe 31 and the distal ends of the sliding parts $27_1$ and $27_2$ can be in contact with an inner circumferential side surface of the main pipe 21, such that the auxiliary pipe 31 is supported in parallel to the main pipe 21 inside the main pipe 21.

In the present embodiment, the sliding parts $27_1$ and $27_2$ are disposed in two different locations which are spaced apart from each other in the longitudinal direction of the main pipe 21. Thus, even if the auxiliary pipe 31 is long, the auxiliary pipe 31 can be easily supported in parallel to the main pipe 21 by supporting the sliding parts $27_1$ and $27_2$ at two locations.

The inner circumferential surface of the main pipe 21 and the outer circumferential surface of the auxiliary pipe 31, which are exposed in the sliding space 26, are oiled surfaces on which a lubricating oil are applied; and friction at the contact portions between the outer circumferential surface of the auxiliary pipe 31 and the distal ends of the sliding parts $27_1$ and $27_2$ is reduced by the lubricating oil.

The sealing members 41 and 42 include first and second cylindrical bellows. The first and second bellows can extend in the longitudinal direction while maintaining the air tightness of the cylinder wall.

In the explanation below, the first bellow is referred to by reference numeral 41a and the second bellow is referred to by reference numeral 42a.

The center axis line of the first and second bellows 41a and 42a is oriented in parallel to the center axis line of the main pipe 21; and the first and second bellows 41a and 42a are disposed at two locations above and below the sliding space 26. Here, the second bellow 42 is disposed at a position that is closer to the first opening 22 than the position of the first bellow 41. The auxiliary pipe 31 is inserted through the inside of the first and second bellows 41a and 42a.

One end of each of the first and second bellows 41a and 42a is closely adhered to and fixed onto the outer circumferential surface of the auxiliary pipe 31 in a ring-shape; and the other end is closely adhered to and fixed onto the inner circumferential surface of the main pipe 21 in a ring-shape. The sliding space 26 is blocked from the inside space of the vacuum tank 11 and the inside space of the collection tank 12 by the first and second bellows 41a and 42a. Therefore, the lubricating oil on the oiled surfaces of the sliding space 26 does not leak into the vacuum tank 11 and the collection tank 12.

<Method for Using the Vacuum Freeze-Drying Apparatus>

The vacuum freeze-drying apparatus 10 includes a control device 60; and the control device 60 is configured to carry out the steps as discussed below.

(Preparation Step)

The inside of the vacuum tank 11 and the inside of the collection tank 12 are vacuum evacuated by the first and second vacuum evacuation devices 13a and 13b, respectively. The vacuum evacuating subsequently continues to maintain vacuum ambiences inside the vacuum tank 11 and the collection tank 12.

In reference to FIG. 1, the surface of the heating/cooling shelf 17 is horizontal. The auxiliary pipe 31 is made to rest at a position where the entire periphery of the bottom end of the auxiliary pipe 31 is in the inside space of the main pipe 21. At this time, the top end of the auxiliary pipe 31 does not collide into the heating/cooling shelf 17.

The valve element 15 is adhered to the valve seat 23 so as to block the first opening 22 in a ring-shape.

A heating medium having temperature that is less than or equal to the freezing temperature of the raw material liquid is fed into the flow path inside the heating/cooling shelf 17 so as to cool the surface of the heating/cooling shelf 17.

(Vacuum Freeze-Drying Step)

When a raw material liquid is injected from the injector 16 into the vacuum tank 11 which has been vacuum evacuated, a liquid component evaporates from the injected raw material liquid, the raw material liquid is instantaneously cooled, and frozen particles are produced.

The raw material liquid includes a liquid component and a solid component (such as, a solute which has been dissolved into the liquid component and a dispersion which has been dispersed into the liquid component) and a solid component which is the same as that of the raw material liquid is included in the frozen particles.

The produced frozen particles fall down and are piled up on the surface of the heating/cooling shelf 17. The surface of the heating/cooling shelf 17 is cooled to less than or equal to the freezing temperature of the raw material liquid; and if the freezing of the frozen particles is insufficient, the frozen particles are additionally cooled and frozen.

The liquid component in the raw material liquid which has evaporated is collected in a cold trap 56 disposed inside the vacuum tank 11.

After the frozen particles have been piled up on the surface of the heating/cooling shelf 17, a heating medium having a temperature greater than or equal to the evaporation temperature of the liquid component of the raw material liquid is fed into the flow path inside the heating/cooling shelf 17 so as to heat the surface of the heating/cooling shelf 17. The liquid component is additionally evaporated from the frozen particles, and the drying of the frozen particles is accelerated.

In reference to FIG. 3, the valve element 15 is separated from the valve seat 23 and the first opening 22 is opened to connect the inside of the vacuum tank 11 and the inside of the collection tank 12.

(Frozen Particle Moving Step)

The auxiliary tube 31 is lowered and then made to rest at a position where the entire periphery of the bottom end of the auxiliary pipe 31 protrudes to the outside of the main pipe 21 through the first opening 22. At this time, the entire periphery of the bottom end of the auxiliary pipe 31 is positioned lower than the bottom end of the valve seat 23.

When the heating/cooling shelf 17 is tilted, the frozen particles that have been piled up on the surface of the heating/cooling shelf 17 slide off to the inside of the opening at the top end of the auxiliary pipe 31.

The frozen particles which slide off are transferred into the collection tank 12 from the bottom end of the auxiliary pipe 31 through the inside of the auxiliary pipe 31.

The vacuum ambience is maintained inside the collection tank 12, and the frozen particles which have been released into the collection tank 12 from the bottom end of the auxiliary pipe 31 do not gain any speed in the vertically upwards direction because they have been discharged into a vacuum. Thus, the released frozen particles do not move upwards higher than the bottom end of the auxiliary pipe 31 and do not reach the valve seat 23.

Figure 4:
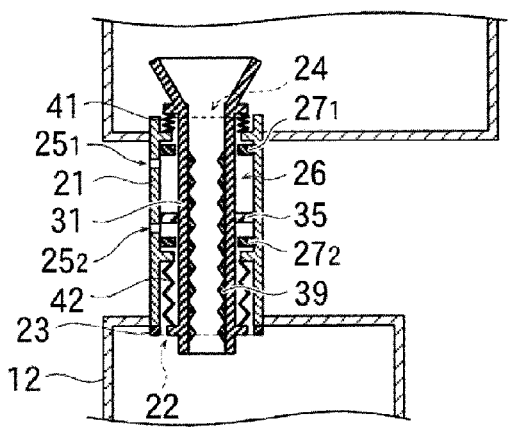
FIG. 4 is a diagram for explaining the structure of a second embodiment of an auxiliary pipe.

In reference to FIG. 4, convex and concave 39 can be formed on the inner circumferential side surface of the auxiliary pipe 31.

If the convex and concave 39 are formed on the inner circumferential side surface of the auxiliary pipe 31, the frozen particles which fall through the inside of the auxiliary pipe 31 collide with the convex and concave 39 and are irregularly reflected. Each time they are irregularly reflected, the kinetic energy of the frozen particles is absorbed by the auxiliary pipe 31 and the absolute value of the horizontal direction component of the speed of the frozen particles decreases. Thus, when the frozen particles are released to the collection tank 12 from the bottom end of the auxiliary pipe 31, diffusion in the horizontal direction of the frozen particles is suppressed and the possibility that the frozen particles may reach the valve seat 23 can be further reduced.

At this time, the surface of the valve element 15 faces the outside of the first opening 22 so that the released frozen particles do not adhere to the surface of the valve element 15.

After the frozen particles have been transferred into the collection tank 12, the surface of the heating/cooling shelf 17 is made horizontal and the auxiliary pipe 31 is raised and then made to rest at a position where the entire periphery of the bottom end of the auxiliary pipe 31 is inside of the main pipe 21.

The surface of the valve element 15 is closely adhered to the valve seat 23 in a ring-shape and the first opening 22 is closed to block the inside of the vacuum tank 11 from the inside of the collection tank 12.

The frozen particles do not adhere to the surface of the valve element 15 and the valve seat 23; and thus, no gap occurs between the valve element 15 and the valve seat 23.

Next, liquid material is injected into the vacuum tank 11 from the injector 16 and the above-discussed vacuum freeze-drying step is carried out inside the vacuum tank 11.

Meanwhile, inside the collection tank 12, the vacuum evacuating done by the second vacuum evacuation device 13b is stopped and the inside of the collection tank 12 is opened to the air atmosphere or a compressed gas is fed into the collection tank 12 from a gas introduction part (not shown), and the frozen particles are carried out to the outside of the collection tank 12.

No leak occurs between the valve element 15 and the valve seat 23 even if the inside of the collection tank 12 is opened to the air atmosphere; and thus, the vacuum freeze-drying performance inside the vacuum tank 11 does not decrease.

After the frozen particles are carried out to the outside of the collection tank 12 from the inside of the collection tank 12, the inside of the collection tank 12 is vacuum evacuated by the second vacuum evacuation device 13b. After a vacuum ambience has been created in the collection tank 12, the valve element 15 is separated from the valve seat 23 and the first opening 22 is opened so as to connect the inside of the vacuum tank 11 and the inside of the collection tank 12.

Similar to the frozen particle transfer step as discussed above, the produced frozen particles inside the vacuum tank 11 are transferred into the collection tank 12 through the inside of the auxiliary pipe 31.

Because the frozen particles do not adhere to the valve seat 23, no leak occurs between the valve element 15 and the valve seat 23 even if the above-described steps are repeated, and the vacuum freeze-drying performance does not decrease.

<Structure of Vacuum Freeze-Drying Apparatus of Second Embodiment>

The structure of a vacuum freeze-drying apparatus of a second embodiment of the present invention will be explained below.

Figure 5:
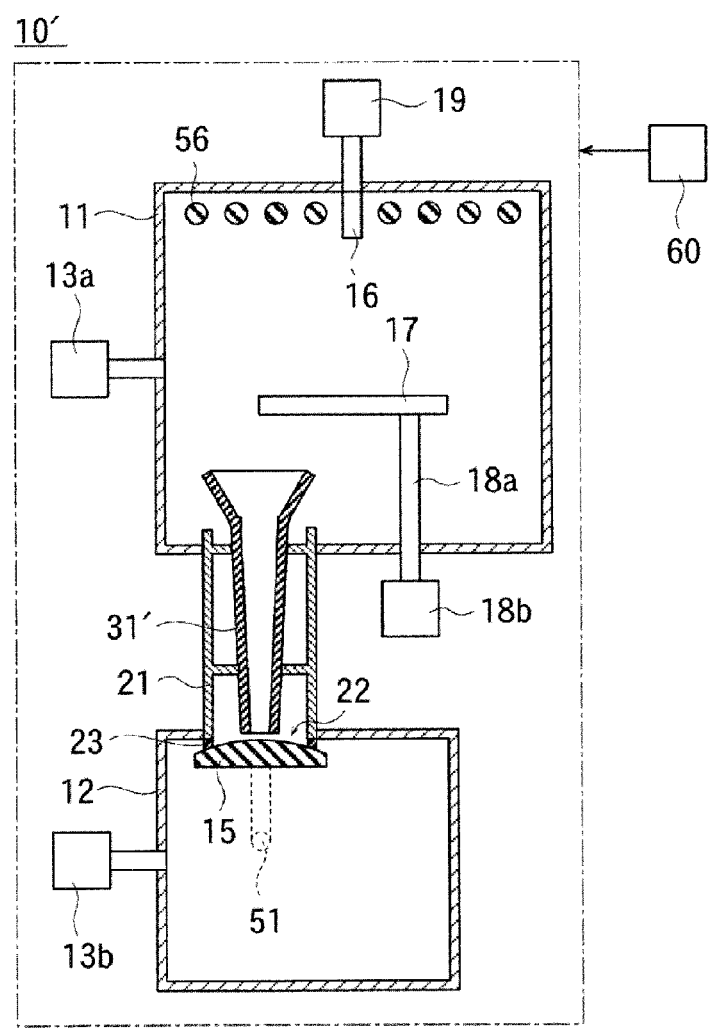
FIG. 5 is an internal configuration view of a vacuum freeze-drying apparatus of a second embodiment of the present invention.

FIG. 5 is an internal configuration view of a vacuum freeze-drying apparatus 10' of the second embodiment of the present invention. Portions, which are identical to the portions of the vacuum freeze-drying apparatus 10 of the first embodiment as discussed above, are indicated by the same reference numerals in the vacuum freeze-drying apparatus 10 of the first embodiment.

The vacuum freeze-drying apparatus 10' of the second embodiment includes a second auxiliary pipe 31' which is inserted into the main pipe 21 instead of the auxiliary pipe 31 and the moving device 45 of the vacuum freeze-drying apparatus 10 of the first embodiment.

The one end of the second auxiliary pipe 31' is formed in a funnel shape in a manner such that the inner circumferential diameter increases towards the end; and the other end of the second auxiliary pipe 31' is formed in a manner such that the inner circumferential diameter gradually decreases towards the end.

The funnel-shaped portion of the one end of the second auxiliary pipe 31' is disposed inside the vacuum tank 11; and the other end is inserted into the main pipe 21 from the top end of the main pipe 21 and made to rest at a position where the entire periphery of the bottom end of the second auxiliary pipe 31' is inside the main pipe 21. The second auxiliary pipe 31' is fixed to the main pipe 21 at this relative position.

The entire periphery of the bottom end of the second auxiliary pipe 31' is disposed inside of the main pipe 21; and even if the surface of the valve element 15 is adhered to the valve seat 23 in a ring-shape, the valve element 15 does not collide with the bottom end of the second auxiliary pipe 31'.

The vacuum freeze-drying apparatus 10' of the second embodiment can be used with the same method for using the vacuum freeze-drying apparatus 10 of the first embodiment, except for the step for moving the auxiliary pipe 31 in the method for using the vacuum freeze-drying apparatus 10 of the first embodiment being omitted.

The frozen particle transfer step of the vacuum freeze-drying apparatus 10' of the second embodiment will be discussed below.

After the frozen particles have been piled up on the surface of the heating/cooling shelf 17, the heating/cooling shelf 17 is tilted. When the frozen particles which have been piled up slide off into the inside of the opening at the top end of the second auxiliary pipe 31', the frozen particles are transferred into the collection tank 12 from the bottom end of the second auxiliary pipe 31' through the inside of the second auxiliary pipe 31'.

The inner periphery of the bottom end of the second auxiliary pipe 31' and the valve seat 23 are separated from each other to the horizontal direction.

The diameter of the inside of the second auxiliary pipe 31' decreases toward the bottom end; and the straightness of the frozen particles passing through the inside of the second auxiliary pipe 31' are increased.

Figure 6:
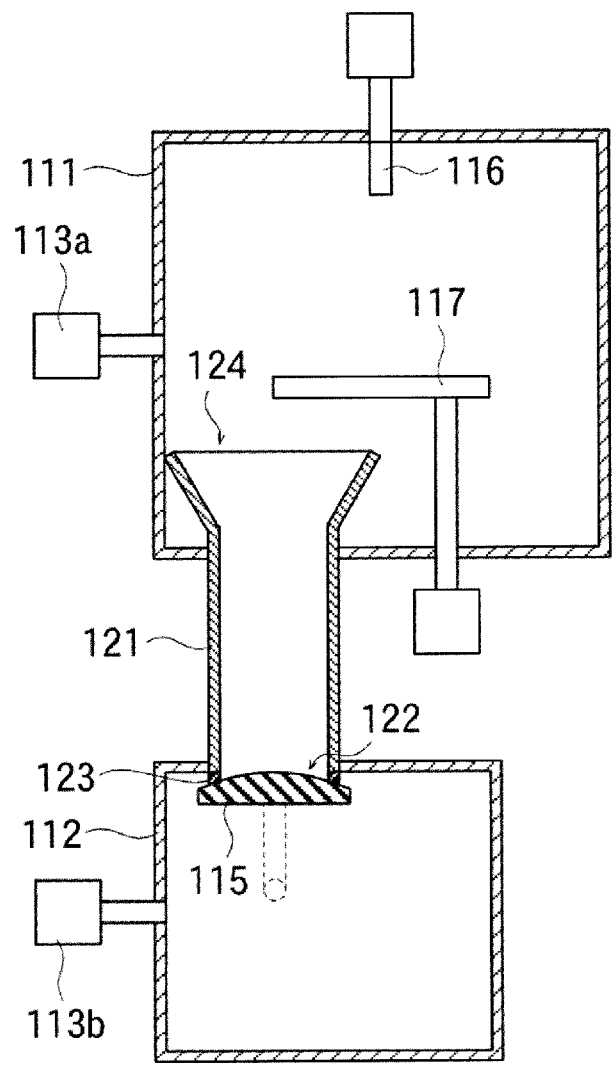
FIG. 6 is an internal configuration view of a conventional vacuum freeze-drying apparatus.

Therefore, the possibility of the frozen particles, which have been released from the bottom end of the second auxiliary pipe 31', reaching and adhering to the valve seat 23 is reduced compared to the conventional vacuum freeze-drying apparatus 100 (refer to FIG. 6).

Because the frozen particles do not adhere to the valve seat 23, no leaks will occur between the valve element 15 and the valve seat 23, even if the apparatus is used repeatedly, and the vacuum freeze-drying performance does not decrease.

As the diameter of the bottom end of the second auxiliary pipe 31' decreases, it becomes more difficult for the frozen particles to reach the valve seat 23. However, the possibility that the frozen particles may become clogged in the inside space of the second auxiliary pipe 31' increases. Thus, the value of the diameter of the bottom end of the second auxiliary pipe 31' can be calculated in advance through experiments and simulations so as to prevent the frozen particles from clogging.

EXPLANATION OF THE REFERENCE NUMERALS

10 . . . vacuum freeze-drying apparatus
11 . . . vacuum tank
12 . . . collection tank
13a . . . first vacuum evacuation device (vacuum evacuation unit)
13b . . . second vacuum evacuation device (vacuum evacuation unit)
15 . . . valve element
16 . . . injector
17 . . . heating/cooling shelf
21 . . . main pipe
22 . . . first opening
24 . . . second opening
26 . . . sliding space
31 . . . auxiliary pipe
39 . . . convex and concave
41,42 . . . sealing members
45 . . . moving device

The invention claimed is:
1. A vacuum freeze-drying apparatus, comprising:
a vacuum tank;
a collection tank disposed below the vacuum tank;
a main pipe having a first opening and a second opening respectively at one end and the other end, the first opening being exposed inside the collection tank and the second opening being exposed inside the vacuum tank;
a valve element which blocks the first opening by adhering to the one end of the main pipe and opens the first opening by separating from the one end of the main pipe, and thereby switches between blocking and opening the first opening;
a vacuum evacuation unit which vacuum evacuates the inside of the vacuum tank and the inside of the collection tank;

an injector which injects a raw material liquid into the vacuum evacuated vacuum tank so as to produce frozen particles; and a heating/cooling shelf disposed inside the vacuum tank on which the produced frozen particles are piled up on the surface of the heating/cooling shelf, wherein after the first opening is opened and the frozen particles on the heating/cooling shelf are transferred into the collection tank through the inside of the main pipe, the first opening is blocked and the frozen particles are carried out from the inside of the collection tank;

the vacuum freeze-drying apparatus, further comprising:

an auxiliary pipe inserted into the main pipe, one end thereof being disposed inside the vacuum tank and the other end thereof being positioned inside the main pipe when the first opening is blocked;

a moving device that reciprocates the auxiliary pipe along the longitudinal direction of the main pipe;

a ring-shaped valve seat which is closely adhered to and fixed onto the one end of the main pipe so as to surround the first opening; and a first and a second bellows having cylindrical shape which can extend in the longitudinal direction, wherein when the first opening is opened, the auxiliary pipe can reciprocate between a position where the other end protrudes to the outside of the main pipe through the first opening and a position where the other end enter the inside of the main pipe through the first opening, wherein the vacuum tank and the collection tank are connected to the vacuum evacuation unit respectively, and are constituted so as to be vacuum evacuated separately, wherein when the first opening is blocked, a surface of the valve element is pressed against the valve seat in such a manner that the valve element is in close contact with the valve seat in a ring shape, wherein when the first opening is opened, the surface of the valve element is turned toward the outside of the first opening, the frozen particles are discharged from the other end of the auxiliary pipe to the collection tank so as to avoid adhering on the surface of the valve element, wherein the collection tank is vacuum evacuated to be a pressure so as to avoid moving the released frozen particle higher than the bottom end of the auxiliary pipe, wherein the frozen particles on the heating/cooling shelf are transferred into the collection tank through the inside of the auxiliary pipe while maintaining vacuum atmospheres of the vacuum tank and the collection tank, wherein the auxiliary pipe is inserted into the first and the second bellows, wherein the one end of the first and the second bellows is connected to the main pipe, and the other end of the first and second bellows is connected to the auxiliary pipe, a sliding space formed between the first bellows and the second bellows is blocked from the inside space of the vacuum tank and the inside space of the collection tank.

2. The vacuum freeze-drying apparatus according to claim 1, wherein a convex and concave portion is provided on an inner circumferential surface of the auxiliary pipe.

3. A frozen particle manufacturing method, comprising the steps of:

vacuum evacuating the inside of a vacuum tank and the inside of a collection tank;

injecting a raw material liquid into the vacuum tank made to be vacuum atmosphere and producing frozen particles;

piling up the frozen particles on a surface of a heating/cooling shelf disposed inside the vacuum tank;

opening a first opening by separating a valve element from a ring-shaped valve seat which is closely adhered to and fixed onto the one end of a main pipe so as to surround the first opening, wherein a main pipe has the first opening and a second opening at one end and the other end, respectively, wherein the first opening being exposed inside the collection tank and the second opening being exposed inside the vacuum tank;

transferring the frozen particles on the heating/cooling shelf in the vacuum tank made to be vacuum atmosphere to the collection tank made to be vacuum atmosphere through the inside of the main pipe, blocking the first opening by adhering the valve element to the one end of the main pipe, and carrying out the frozen particles from the inside of the collection tank, the method being characterized in that:

wherein when the first opening is blocked, a surface of the valve element is pressed against the valve seat in such a manner that the valve element is in close contact with the valve seat in a ring shape, wherein when the first opening is opened, the surface of the valve element is turned toward the outside of the first opening, the frozen particles are discharged from the other end of the auxiliary pipe to the collection tank so as to avoid adhering on the surface of the valve element, and wherein the collection tank is vacuum evacuated to be a pressure so as to avoid moving the released frozen particle higher than the bottom end of the auxiliary pipe, after piling up the frozen particles on the surface of the heating/cooling shelf and opening the first opening of the main pipe while vacuum evacuating the inside of the vacuum tank and the inside of the collection tank separately, moving an auxiliary pipe which is inserted in the main pipe and which has one end being disposed inside the vacuum tank and the other end being positioned inside the main pipe to a position where the other end of the auxiliary pipe protrudes to the outside of the main pipe through the first opening;

transferring the frozen particles on the heating/cooling shelf into the collection tank through the inside of the auxiliary pipe;

wherein the auxiliary pipe is inserted into a first and a second bellows having cylindrical shape which can extend in the longitudinal direction, blocking a sliding space formed between the inside of the vacuum tank and the inside of the collection tank by connecting the one end of the first and second bellows to the main pipe, and by connecting the other end of the first and second bellows to the auxiliary pipe;

moving the auxiliary pipe to a position where the other end enters the inside of the main pipe through the first opening;

blocking the first opening; and carrying out the frozen particles from the inside of the collection tank.

4. The vacuum freeze-drying apparatus according to claim 1, further comprising;
   a sliding part provided in the sliding space,
   wherein the sliding space is fixed to either one end of the main pipe or the auxiliary pipe, and the sliding space is in contact with either the other end the main pipe or the auxiliary pipe, and the auxiliary pipe is supported by the main pipe.

5. The vacuum freeze-drying apparatus according to claim 4,
   wherein an inner circumferential surface of the main pipe and the outer circumferential surface of the auxiliary pipe, which are exposed in the sliding space, are oiled surfaces on which a lubricating oil are applied.

6. The frozen particle manufacturing method according to claim 3, further comprising the steps of:
   providing a sliding part in the sliding space,
   wherein the sliding space is fixed to either one end of the main pipe or the auxiliary pipe, and the sliding space is in contact with either the other end the main pipe or the auxiliary pipe, and the auxiliary pipe is supported by the main pipe.

7. The frozen particle manufacturing method according to claim 6,
   wherein an inner circumferential surface of the main pipe and the outer circumferential surface of the auxiliary pipe, which are exposed in the sliding space, are oiled surfaces on which a lubricating oil are applied.

\* \* \* \* \*